Aug. 9, 1949.　　　　L. V. MICHAL　　　2,478,414
BREAKDOWN TESTING APPARATUS
Filed Jan. 7, 1944　　　　　　　　　　2 Sheets-Sheet 1
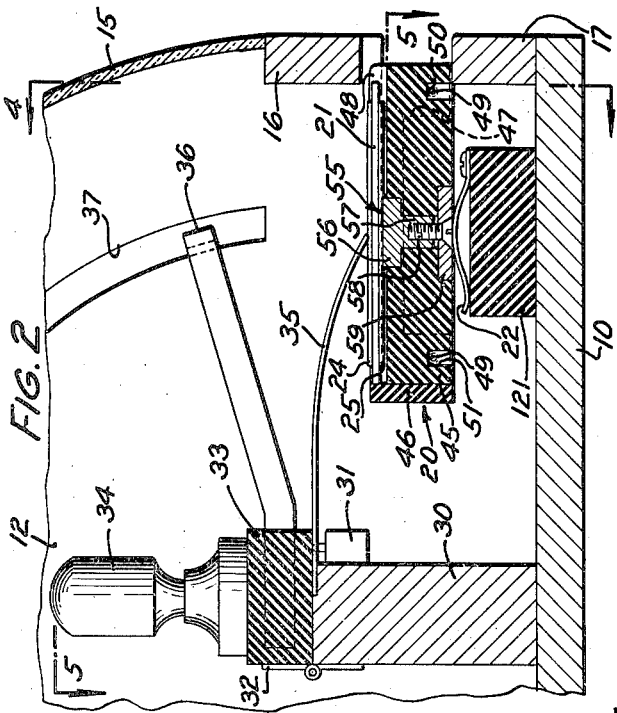
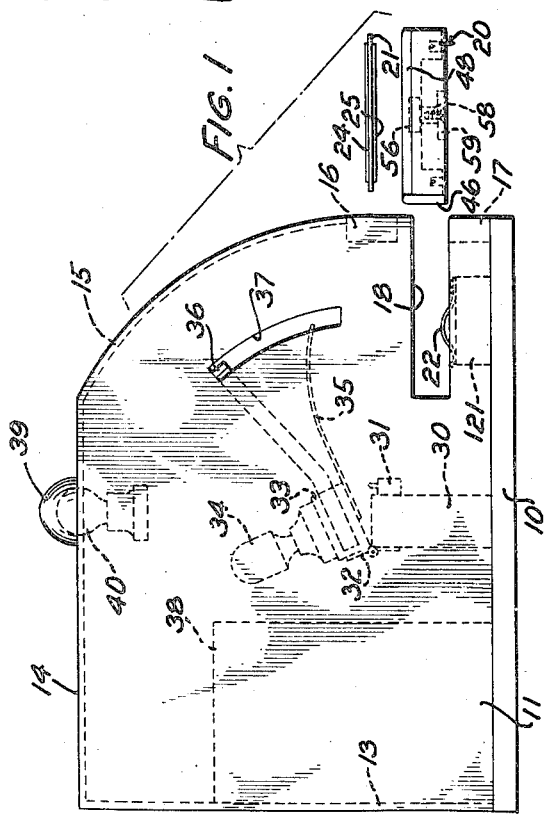
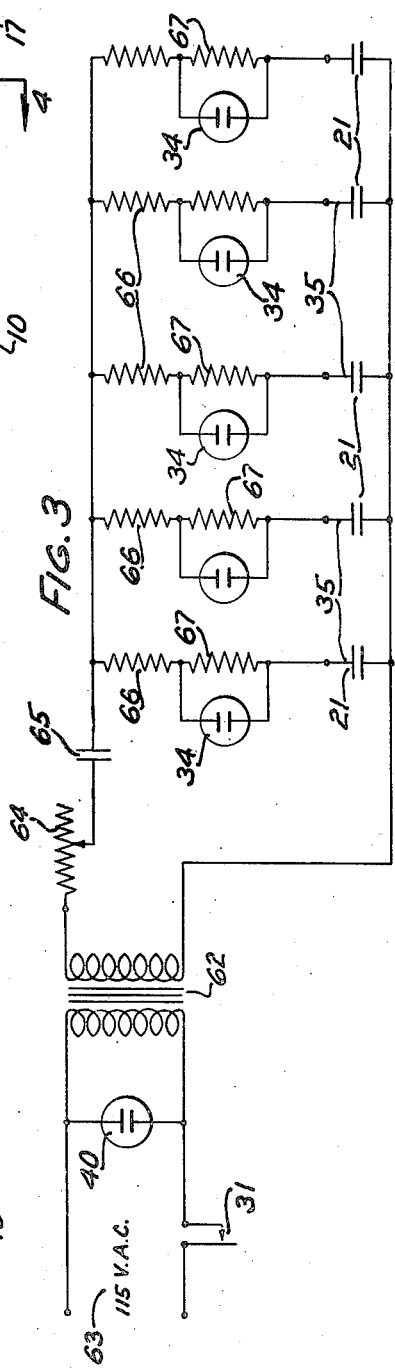
INVENTOR
L. V. MICHAL
BY
ATTORNEY

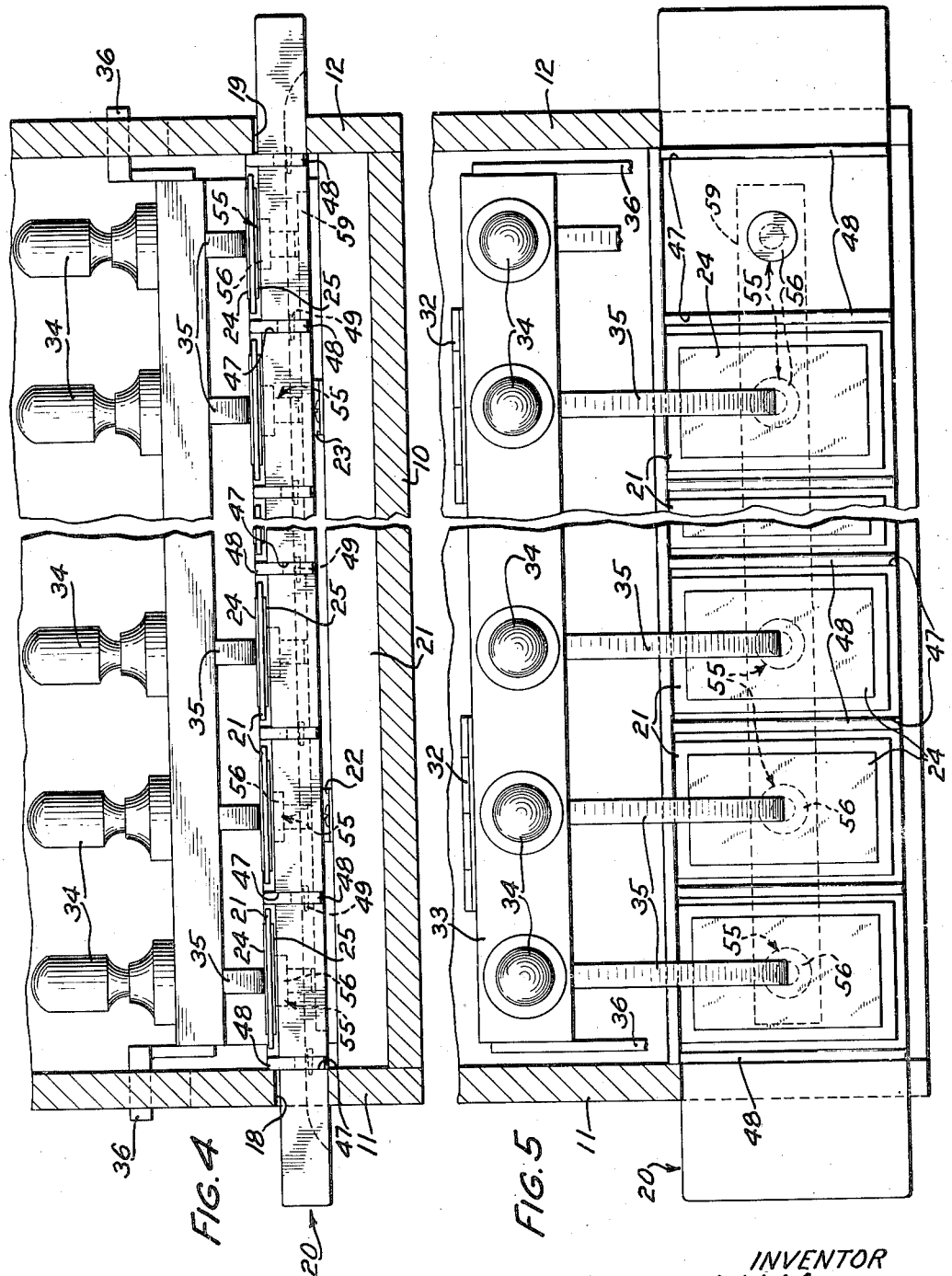

Patented Aug. 9, 1949

2,478,414

UNITED STATES PATENT OFFICE 2,478,414

BREAKDOWN TESTING APPARATUS

Leon V. Michal, Chicago, Ill., assignor to Western Electric Company, Incorporated, New York, N. Y., a corporation of New York Application January 7, 1944, Serial No. 517,352

4 Claims. (Cl. 175—183)

This invention relates to breakdown testing apparatus, and more particularly to apparatus for testing dielectric laminations for breakdown.

It is an object of the present invention to provide a simple and accurate apparatus for rapidly making breakdown tests.

In accordance with one embodiment of the invention as applied to the making of a breakdown test on mica laminations having silver sheets applied to opposite faces thereof, a plurality of laminations are placed in a rack or cradle which may then be slipped into a testing fixture having spring contacts to bear against a conducting member common to all compartments on the rack or cradle. After the rack or cradle has been thus positioned in the fixture, a hinged bracket supporting a number of neon lamps equal in number to the number of compartments on the cradle may be rocked to carry spring contact fingers individual to the lamps into contact with a surface of the laminations. The neon lamps are connected in parallel to the output of a high voltage transformer and are each in series with a relatively high resistance, part of which is shunted by the neon lamp whereby when a breakdown occurs in one of the laminations, its associated lamp will be lighted but will not interfere with the other test circuits in parallel with it.

A complete understanding of the invention may be had by reference to the following detailed description when considered in conjunction with the accompanying drawings, wherein:

Fig. 1 is a side elevational view of apparatus comprising a preferred embodiment of the invention, the cradle or rack and a lamination to be tested being shown out of the apparatus preliminary to their insertion therein;

Fig. 2 is a transverse vertical sectional view on an enlarged scale taken through the apparatus;

Fig. 3 is a circuit diagram showing the manner in which the various parts of the electrical apparatus are interconnected;

Fig. 4 is a vertical sectional view taken substantially along the line 4—4 of Fig. 2 in the direction of the arrows; and Fig. 5 is a plan sectional view taken substantially along the line 5—5 of Fig. 2 in the direction of the arrows.

In the drawings, as illustrated in Figs. 1, 2, 4 and 5, a fixture is provided comprising a base 10 having side members 11 and 12 and a back plate 13. Interposed between the side members is a cover plate 14 which extends between the side members in a horizontal plane and abuts a rounded transparent plastic case front 15, which is also mounted between the side members and which has its bottom end resting on a cross bar 16. In addition to the cross bar 16, there is a cross bar 17 spaced from the cross bar 16 and extending between the side members 11 and 12, and intermediate the cross bars 16 and 17 are slots 18 and 19, which are formed in the side members 11 and 12, respectively, to receive a rack or cradle designated generally by the numeral 20 to hold mica laminations 21 in position to be tested in the apparatus. Extending between the side members 11 and 12 is a block 124 of insulating material having a pair of contact springs 22 and 23 mounted on it for contacting with a portion of the rack 20.

The laminations to be tested in the apparatus comprise strips of mica 24, on opposite surfaces of which silver sheets or plates 24 and 25 have been fixed. These laminations are placed on the rack 20 while the rack is out of the testing fixture and a group of the laminations may thus be tested simultaneously by inserting the rack holding them in the apparatus.

Extending across the base 10 between the side members 11 and 12 is a support block 30 having a switch 31 of the type known as a "micro-switch" mounted upon its front face. The support block 30 has a hinge 32 attached to it and to a mounting block 33 made of insulating material and supporting a plurality of neon lamps 34. In addition to supporting the neon lamps 34, the mounting block 33 carries a series of leaf springs 35, of which there is provided one for each lamination supporting section of the rack 20. These leaf springs are connected to the neon lamps 34 and constitute contact members for interconnecting the upper silver sheet or plate 24 and the lamp 34 in the circuit during the testing of the laminations. The switch 31 serves to close the main switch of the testing circuit when the mounting block 23 is rocked to the position shown in Fig. 2, which movement will carry the contact springs into engagement with the laminations and close the switch 31. The mounting block 33 is provided with a pair of handles 36 which extend through arcuate slots 37—37 formed in the side members 11 and 12 to permit the rocking of the mounting plate 32 and parts carried thereby from the position shown in Fig. 1 to the position shown in Fig. 2. Any suitable means may be provided for either urging the mounting block 33 to the position shown in Fig. 1 or for resisting movement of the handles 36 throughout their entire movements so that the handles may be moved to the position shown in Fig. 1 and will remain in that position.

The various pieces of apparatus comprising the testing circuit and which are not mounted upon the mounting block 33 are mounted within a casing 38 mounted on the base 10 at the back end of the apparatus, as shown in Fig. 1. Suitably mounted in the cover plate 14 is a bezel 39, beneath which may be positioned a neon lamp 40, which serves to indicate when power is supplied to the testing apparatus upon the closure of the switch 31.

The rack or cradle 20 comprises a main block 45 of insulating material, as shown most clearly in Fig. 2, which is rectangular in shape and has a back member 46, also of insulating material, suitably attached thereto for preventing the laminations from slipping off the back end of the rack. A series of slots 47—47 are formed in the block 45 to receive spacers 48, which are held in place on the main block 45 by means of pins 49 inserted in the apertures in the spacers 48 and resting against the bottoms of slots 50 and 51, which extend longitudinally of the main block 45.

In the preferred embodiment of the invention, there are ten lamination-receiving sections formed on the rack 20 and, therefore, there are 11 slots 47 cut in the block. To conserve space, only five of the sections have been shown and the figures of the drawing have been broken through the middle to indicate the fact that a number of positions are omitted. Any suitable number of laminations may be tested at one time, but it has been found advisable to test just ten of them at a time.

The main block 45 has a series of contact members 55 mounted thereon. These contact members comprise a head portion 56, as shown most clearly in Fig. 2, and a shank 57, which is threaded to receive a machine screw 58. The machine screws 58 are seated in a conductor plate 59, which extends across beneath all of the lamination supporting sections of the rack and when the rack is positioned in the apparatus, the conductor plate will rest upon the contact springs 22 and 23, thus to connect the silver plate 25 on the lamination 21 in each section of the rack with the testing circuit.

As shown in Fig. 3, the laminations 21 to be tested will thus be connected in parallel across a circuit from a transformer 62, which is supplied with power from 115 volt A. C. source 63 upon closure of the switch 31 and which will apply a thousand volts through an adjustable resistance 64 and a condenser 65 to the parallel circuits in which the laminations 21 are connected by means of the contact springs 22 and 23 and contact springs 35. Each of the circuits leading from the contact springs 35 is connected directly to one of the neon lamps 34 and thence through a 90,000 ohm resistor 66 and back to the output side of the transformer 62. Connected in series with each of the 90,000 ohm resistances is a 10,000 ohm resistance 67 and the neon lamp is connected in shunt across the 10,000 ohm resistance. In the operation of the apparatus, ten laminations 21 having silver plated sheets, as shown at 24 and 25, may be placed on the rack 30 and the rack may then be slid in position as shown in Fig. 2, where each lamination to be tested will be aligned with the contact spring 35 fixed on the support block 33. The handles 36 may then be moved from the position shown in Fig. 1 to the position shown in Fig. 2. When the handles are thus moved to operative position, the switch 31 will be closed to supply power to the testing circuit and since the neon lamp 40 is connected across the 110 volt source 63, closure of the switch 31 will complete the circuit to lamp 40 to indicate that power is being supplied through the transformer 62 to the underside of all of the laminations 21 which have their silver plate 25 in engagement with one of the contact members 55. The breakdown circuit across the laminations will be completed by the contacting of the contact springs 35 with the plate 24 on the upper surface of the laminations and if none of the laminations break down under the test, none of the lamps 34 will be lighted. However, if one of the laminations being tested breaks down upon the application thereto of the 1000 volt testing current, its associated neon lamp 34 will be lighted. The lighting of a neon lamp 34 due to the breaking down of the lamination 21 associated therewith will not disturb the test circuits to other laminations being tested simultaneously, due to the fact that the neon lamp 34 is connected in shunt across a 10,000 ohm resistance which is, together with the lamp 34, in series with the 90,000 ohm resistance 66 individual to it. In this manner, the application of the test to those laminations which are satisfactory will not be interfered with by the breaking down of one of the laminations since the total current of all the parallel circuits at breakdown will not be great enough to reduce the voltage below the minimum desired.

What is claimed is:

1. In a breakdown testing apparatus, a rack for holding a plurality of specimens to be tested, a fixture for receiving said rack, means on said rack for contacting one side of each of the specimens, a hinged frame, a plurality of neon lamps on said frame, contact fingers on said frame for interconnecting the specimens separately in series with the lamps, a resistance in series with each of said lamps, resistances individual to and in shunt with said lamps, and means for connecting said means on said rack and said resistances to a source of high potential to supply a high voltage to all of the specimens.

2. In a breakdown testing apparatus, a rack for holding a plurality of specimens to be tested, a fixture for receiving said rack, means on said rack for contacting one side of each of the specimens, a hinged frame, a plurality of neon lamps on said frame, contact fingers on said frame for interconnecting the specimens separately in series with the lamps, a resistance in series with each of said lamps, resistances individual to and in shunt with said lamps, means for actuating the hinged frame to engage all of the contact fingers simultaneously with their associated specimens and means for connecting said means on said rack and said resistances to a source of high potential for supplying a high voltage to all of the specimens.

3. In a breakdown testing apparatus, a rack for holding a plurality of specimens to be tested, a fixture for receiving said rack, means on said rack for contacting one side of each of the specimens, a hinged frame, a plurality of neon lamps on said frame, contact fingers on said frame for interconnecting the specimens separately in series with the lamps, a resistance in series with each of said lamps, resistances individual to and in shunt with said lamps, and a source of power connectible to supply current in parallel to all of the specimens through the means contacting one side of the specimen and through the contact fingers.

4. In a breakdown testing apparatus, a rack for holding a plurality of specimens to be tested, a fixture for receiving said rack, means on said rack for contacting one side of each of the specimens, a hinged frame, a plurality of neon lamps on said frame, contact fingers on said frame for interconnecting the specimens separately in series with the lamps, a resistance in series with each of said lamps, resistances individual to and in shunt with said lamps, a source of power connectible to supply current in parallel to all of the specimens through the means contacting one side of the specimen and through the contact fingers, and a switch operable by the hinged frame for closing the circuit to the power source.

LEON V. MICHAL.

REFERENCES CITED

The following references are of record in the file of this patent:

UNITED STATES PATENTS

| Number | Name | Date |
| --- | --- | --- |
| 494,239 | Barnett | Mar. 28, 1893 |
| 1,506,761 | MacPherson | Sept. 2, 1924 |
| 1,514,555 | Meehan | Nov. 4, 1924 |
| 1,561,483 | Pickard | Nov. 17, 1925 |
| 1,903,496 | Beck | Apr. 11, 1933 |
| 1,950,484 | Clarvoe | Mar. 13, 1934 |
| 2,094,645 | Foulke | Oct. 5, 1937 |
| 2,245,603 | Paul | June 17, 1941 |
| 2,328,107 | Sulzer | Aug. 31, 1943 |
| 2,400,751 | Gage | May 21, 1946 |